United States Patent [19]
Hill et al.

[11] Patent Number: 5,438,617
[45] Date of Patent: Aug. 1, 1995

[54] LOW FREQUENCY DIGITAL NETWORK CROSS-CONNECT PANEL

[75] Inventors: Timothy L. Hill, Spokane, Wash.; Paul D. Johnson, Post Falls, Id.; Donald R. Skinfill; Douglas E. Prussack, both of Veradale, Wash.

[73] Assignee: Telect, Inc., Liberty Lake, Wash.

[21] Appl. No.: 223,107

[22] Filed: Apr. 4, 1994

[51] Int. Cl.$^6$ ............................................. H04M 1/00
[52] U.S. Cl. .................................... 379/327; 377/326
[58] Field of Search ................ 439/188; 361/826, 827, 361/828; 379/326, 327

[56] References Cited

U.S. PATENT DOCUMENTS

| | | | |
|---|---|---|---|
| 4,737,985 | 4/1988 | DeLuca et al. | 379/327 |
| 4,975,087 | 12/1990 | Williams et al. | 439/668 |
| 5,199,878 | 4/1993 | Dewey et al. | 439/188 |
| 5,265,156 | 11/1993 | Eason et al. | 379/327 |

OTHER PUBLICATIONS

"ADC Digital Distribution Panel," ADCP 80–500, p. 1-1 thru p. 2-30, ADC Telecommunications, Inc., 1991.
Augat Telzon "DS-1 Cross-Connect/Test Access Panel (DSX TAP)" Technical Practice 49211, pp. 1-4, Augat Communications Group, Inc., 1991.

Primary Examiner—James L. Dwyer
Assistant Examiner—Daniel Hunter
Attorney, Agent, or Firm—Wells, St. John, Roberts, Gregory & Matkin

[57] ABSTRACT

A low frequency (1–3 Mbps) telecommunication network cross-connect panel 10 is described for cross-connecting eighty-four fiber multiplex circuit elements 12 and eighty-four digital loop carrier circuits 14. The panel 10 has a housing 16 for supporting twenty-one modules 30 in which each module 30 has an upper patch access section 34 and a lower cross-connection field section 36. The upper section 34 includes two sets of front access wire-wrap pins 50 and 56 for providing front patch access capability utilizing a female patch plug 130. The lower cross-connection section 36 includes two sets of cross-connect pins 62 and 68 providing eighty-four columns of eight pins each defining a cross-connect field. Each module 30 includes a printed circuit board 40 for physically electrically interconnecting the pins through electrical circuits 100, 102, 104, and 106 as illustrated in FIG. 5. The printed circuit board includes an electrical switch means 108 that is a make-before-break arrangement in which front access contact is made prior to interrupting the circuit 100, 102, 104 and 106.

37 Claims, 10 Drawing Sheets

LOW FREQUENCY DIGITAL NETWORK CROSS-CONNECT PANEL

TECHNICAL FIELD

This invention relates to low frequency (DSS-1, DS-1C, and DS-2) telecommunication digital network cross-connect panels to facilitate terminating, monitoring, testing and front cross-connecting of low frequency telecommunication network circuits, particularly between digital fiber multiplex networks and digital loop carrier networks.

BACKGROUND OF THE INVENTION

One of principal problems facing telephone companies, is the difficulty of increasing the number of telecommunication network circuits without increasing the size of the terminating and switch facilities. Economy of space is very important.

Additionally maintaining versatility and the ability to test, monitor and patch cross-connect circuits is also important. With more and more switching being done electronically, the consequences of equipment failure becomes more serious. If a single electronic switching network fails, thousands of telecommunication circuits may be interrupted and adversely affected. Consequently there is a need to provide manual test, monitor and patch cross-connecting capability to the network circuits, while at the same time reducing the cost and panel space required to provide such functions.

At the present time, Augat Communications Group Inc. of Bellevue, Wash., provides a digital interface cross-connect panel called "DS-1 CROSS-CONNECT/TEST ACCESS PANEL" or "DSX TAP" that is designed to terminate, cross-connect and provide serial and bridged test access to one hundred sixty-eight four-wire digital equipment ports for mounting on a standard 23-inch rack shelf within a vertical space of less than six inches of vertical space on the rack shelf. To obtain test access to a circuit, the DSX TAP panel utilizes two rows of 42 special card connector blocks each capable of receiving a special "access jack card" having a test card that leads to two bantam jacks mounted on the front of the panel. Each front connector has four sets of make-before-brake contacts. The four contacts of the right side of each connector is electrically connected to corresponding multiplexer equipment pins on the upper rear of the panel. The contacts on the left side of each connector are electrically connected to the corresponding multiplexer equipment on the lower front. Although the panel provides a high density arrangement, when compared with conventional cross-connect jack panels, it is still a rather expensive arrangement and only allows access to two circuits at a time. In addition, the panel only provides patch access to one piece of equipment at a time.

One of the principal objects and advantages of this invention is to provide a unique low frequency telecommunication digital network interface cross-connect panel that increases the number (density) of network circuits that may be terminated and cross-connected within a limited space and that is less costly than previous digital interface cross-connect panels, while providing testing, monitoring and patch cross-connect access to all of the circuits all of the time.

An additional object and advantage of this invention is to provide a unique low frequency telecommunication digital network interface cross-connect panel having the ability to handle up to 168 circuits on a standard 23 inch rack self within in a vertical panel space of 6 inches. at a lesser cost.

A further object and advantage of this invention is to provide a unique low frequency telecommunication digital network interface cross-connect panel that is less expensive providing a low cost alternative to conventional digital cross-connect jack panels.

These and other objects and advantages of this invention will become apparent upon reading and understanding the following detailed description of a preferred embodiment.

BRIEF DESCRIPTION OF THE DRAWINGS

Preferred embodiments of the invention are described below with reference to the accompanying drawings, which are briefly described below.

FIG. 3 is a plan view of the front cross-connect panel illustrated in FIG. 1;

FIG. 7 is an enlarged exploded view of several of the components of the cross-connect panel;

FIG. 8 is an enlarged fragmentary vertical cross-section view taken along 8—8 in FIG. 3 of a portion of the panel illustrating a patch cord plug about to be inserted into the front of panel;

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
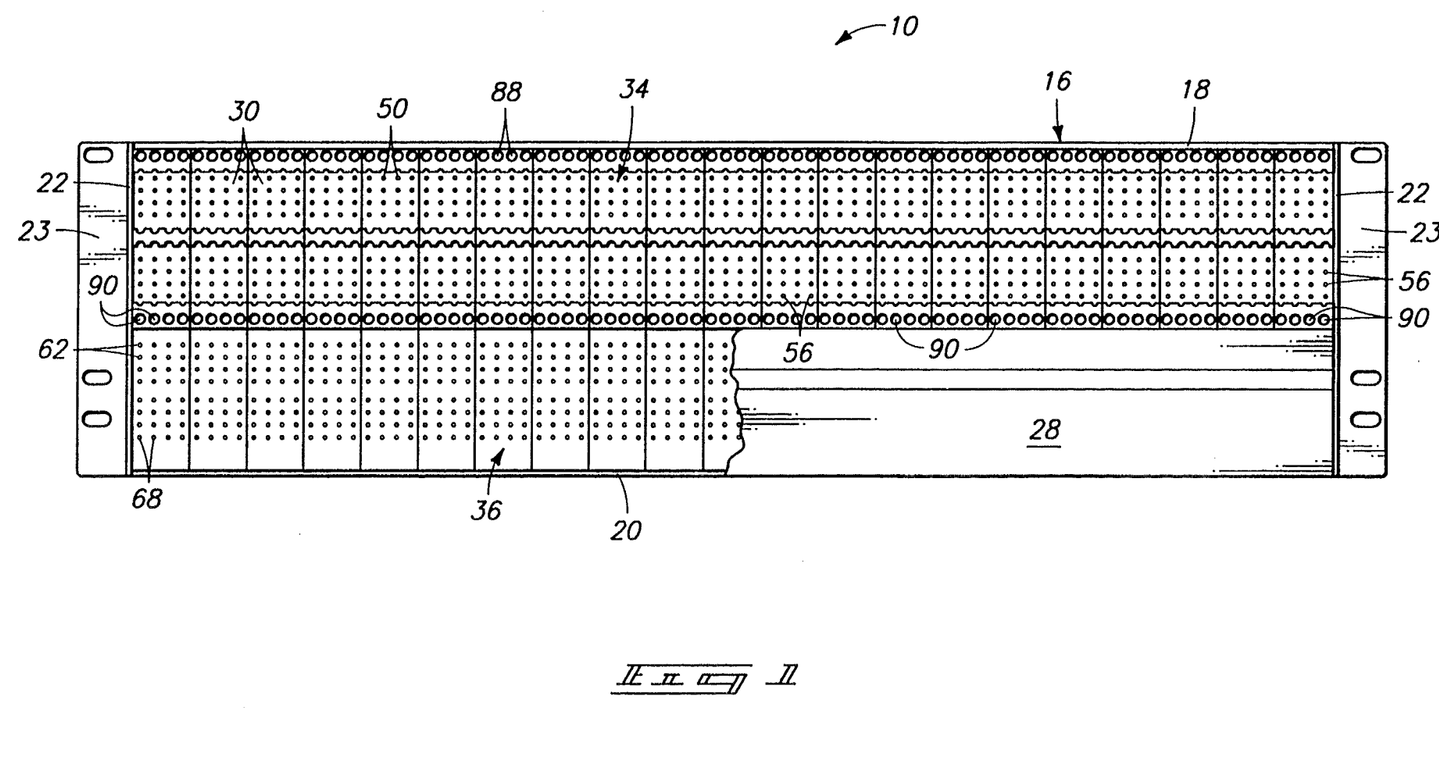
FIG. 1 is front elevational view of a preferred embodiment of a low frequency telecommunication network front cross-connect panel.
Figure 2:
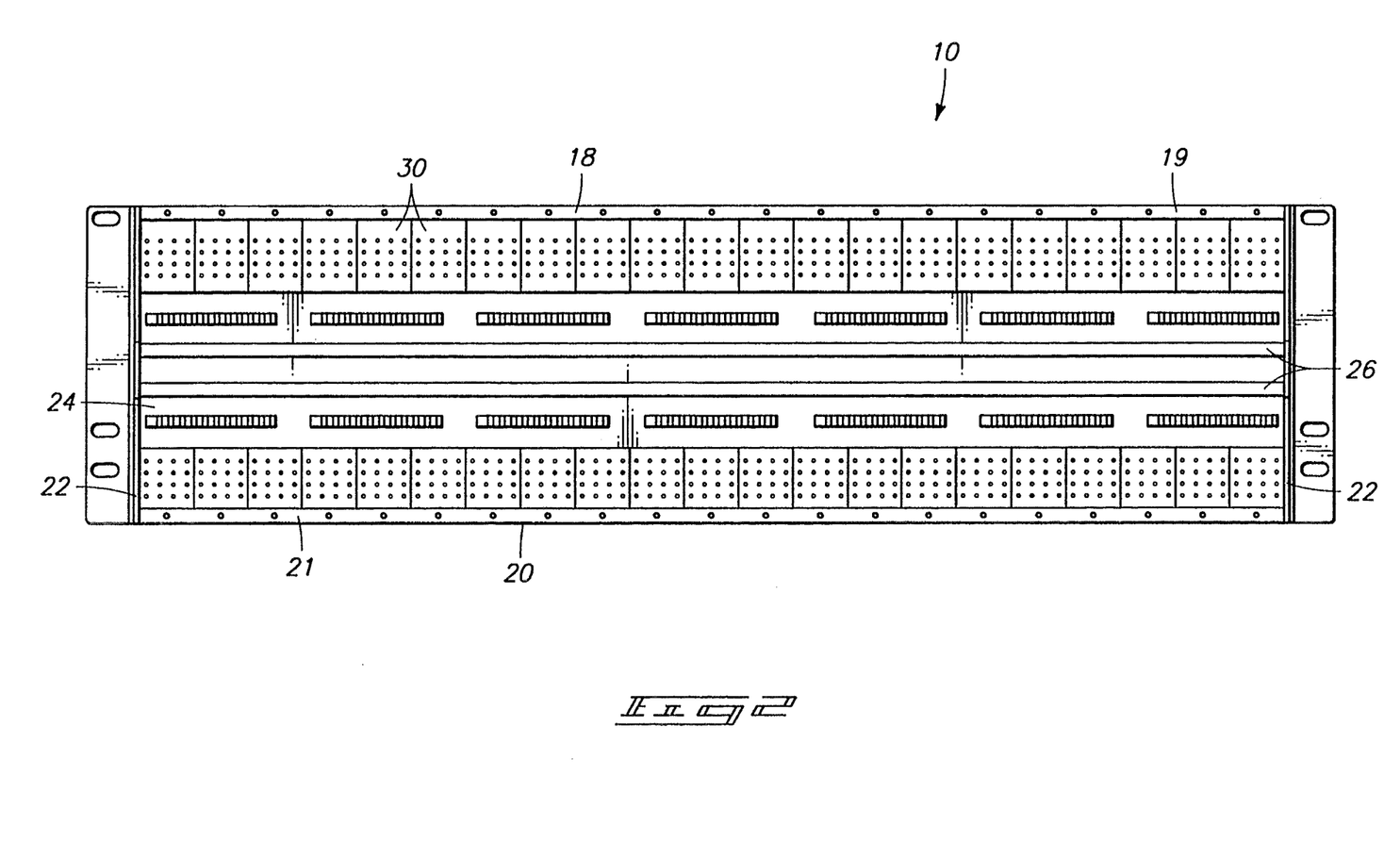
FIG. 2 is a rear elevational view of the front cross-connect panel illustrated in FIG. 1.
Figure 5:
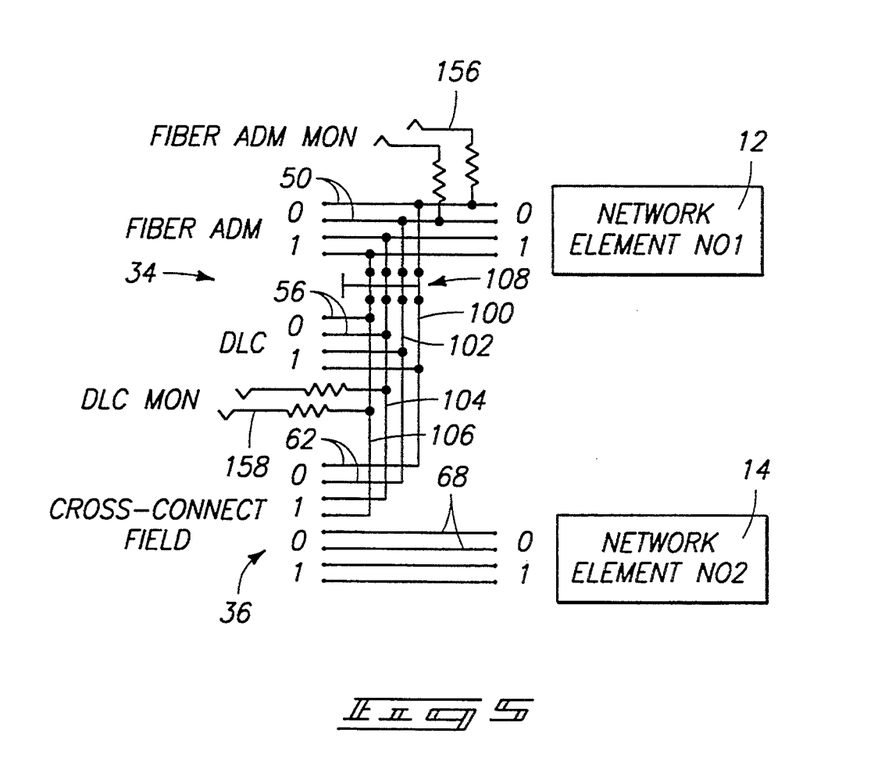
FIG. 5 is an electrical schematic of electrical circuits incorporated in the cross-connect panel illustrated in FIG. 1.

Referring now to the drawings, there is illustrated in FIGS. 1–3 a low frequency telecommunication network cross-connect panel generally designed with the number 10 for providing termination, front test monitoring and patch access and front cross-connecting capability with respect to four wire network elements such as fiber multiplex circuits and digital loop circuits. Two of such four wire network elements are illustrated in FIG. 5 with numerals 12 and 14.

The panel 10 is generally designed to be mounted on a panel rack between two uprights (not shown). The particular high density panel 10 is ideal for remote huts, equipment pedestal cabinets and controlled environment vaults. It has a very low profile and high density which saves valuable rack space and overall costs, while providing complete circuit access. The panel 10 provides access for low frequency telecommunication signals of between 1 and 3 Mbps. The panel 10 is designed to mount onto an industrial standard 23-inch equipment rack or cabinet. Preferably the panel 10 provides rear wire-wrap terminal points for eighty-four fiber multiplex (MUX) circuits 12 and eighty-four digital loop carrier (DLC) circuits 14.

The panel 10 includes the panel housing 16 having a top wall 18, a bottom wall 20, side walls 22 and a back wall 24. Cross supports 26 extend between the side walls 22 at the back of the housing to provide cable support. The top wall 18 has a top flange 19 that is bent downward in a 90° angle to serve as a mounting flange. Additionally, the bottom wall 20 includes a bottom flange 21 that is bent upward to additionally serve as a mounting flange. The housing 16 includes side bracket 23 for facilitating the mounting of the panel 10 to a rack or other support.

Figure 4:
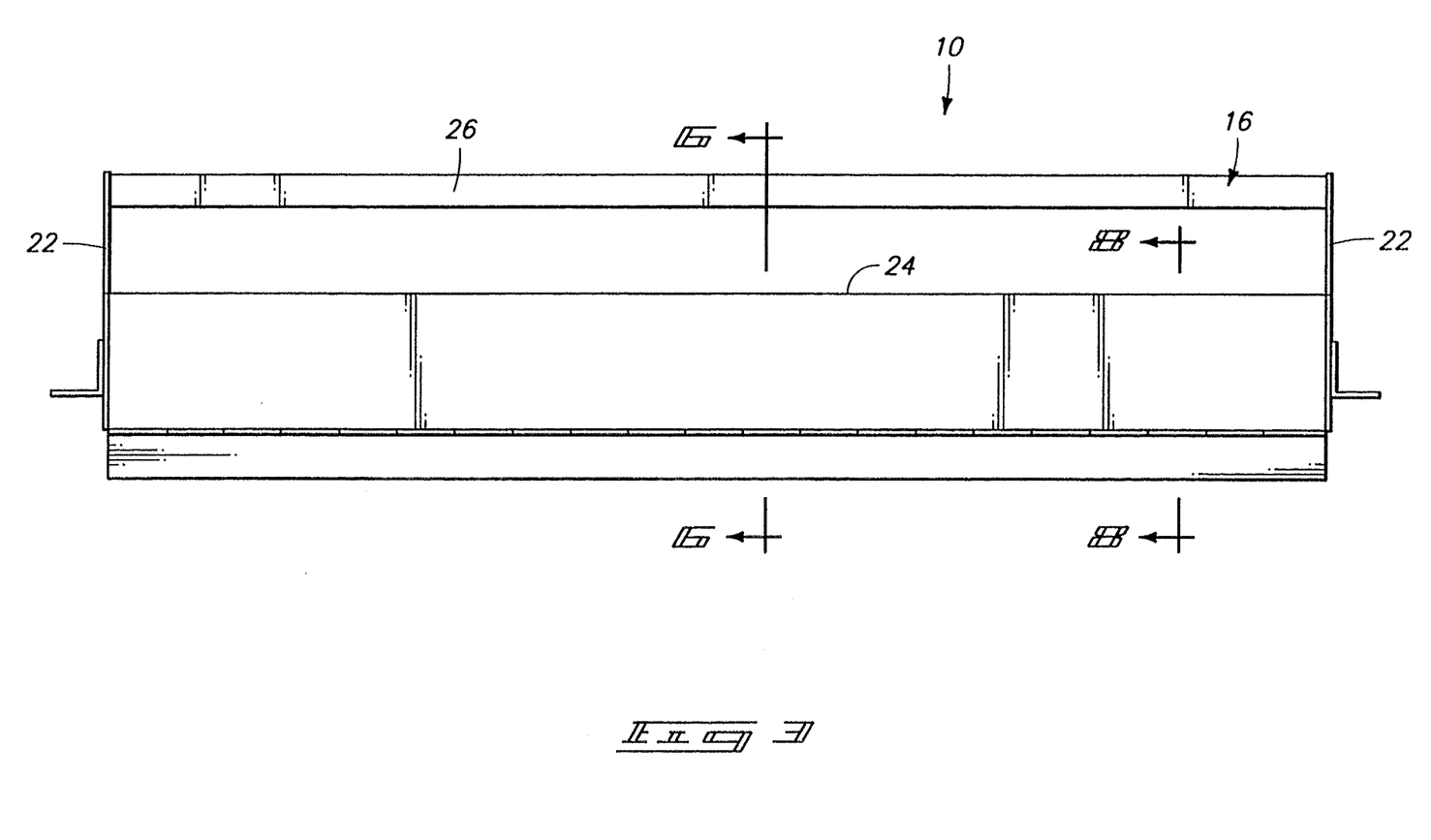
FIG. 4 is a right side view of the cross-connect panel illustrated in FIG. 1.

The housing 16 (FIGS. 1 and 4) additionally includes a front jack field cover 28 that is pivotally mounted to the bottom wall 20. The front jack field cover 28 is generally formed of a transparent material with inscription lines formed thereon to enable the telecommunication worker to inscribe on the front cover information concerning cross-connect circuit identification.

The panel 10 importantly includes one or more modules 30 that are mounted in the housing 16. In the preferred embodiment, the panel 10 includes twenty-one adjacent modules 30 that are each approximately one inch in width, with each module 30 designed to interconnect eight network elements 12, 14. All twenty-one modules 30 are capable of providing a high density service to one-hundred-sixty-eight network elements 12, 14.

Figure 6:
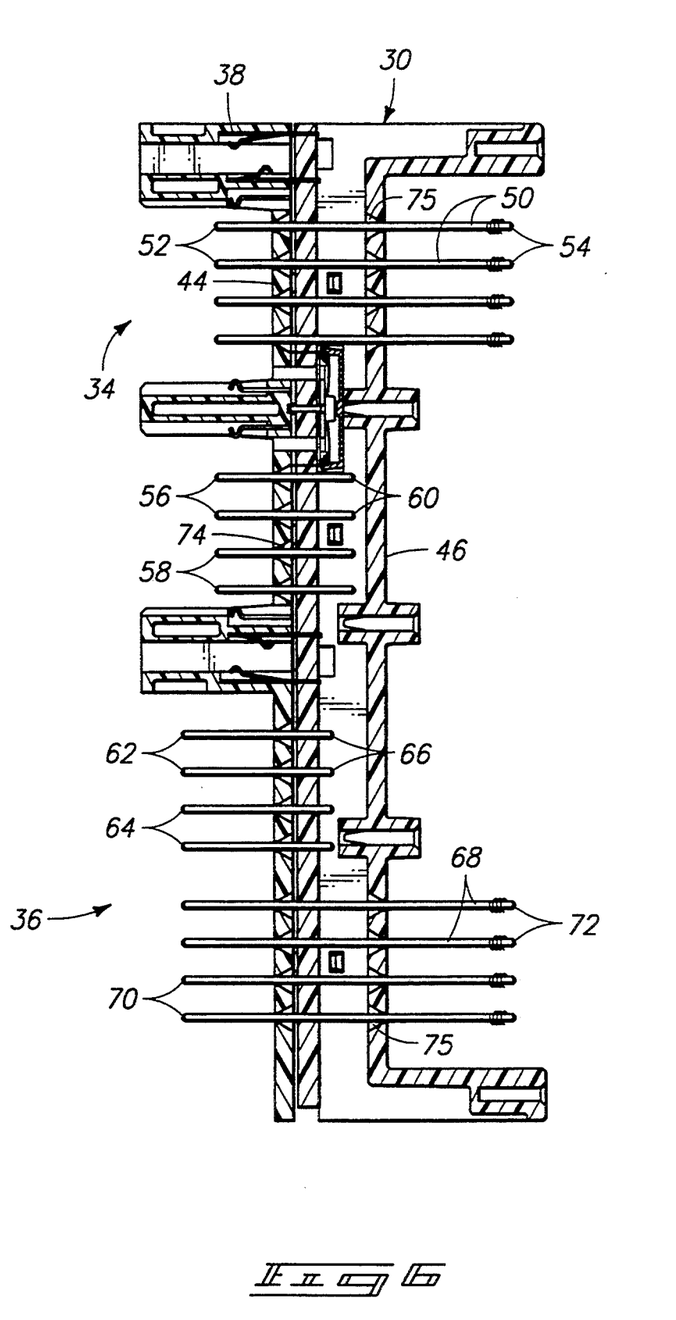
FIG. 6 is a vertical cross-sectional view taken along line 6—6 in FIG. 3, illustrating the interior of the panel.

Each module 30 (FIG. 6) includes a body with an upper test access section 34 and a lower cross-connect field section 36.

Each module 30 (FIGS. 6–9) body, includes a front module member 38, a printed circuit board member 40 and a rear module member 42, servicing both the upper section 34 and the lower cross-connect field section 36. The front module member 38 includes a front face 44 facing outward from the module. The rear module member 42 includes a rear face 46. The printed circuit board members have actuator apparatuses 48.

Each module 30 includes a first set of front access pins 50 affixed to the printed circuit board member 40 that are formed of wire-wrap square pins preferably having a side diameter of 0.045 inches. The first set of front access pins 50 are preferably formed on ¼-inch centers in four columns of four pins each. The first set of front access pins 50 have a prescribed length of approximately 2.75 inches. Each of the pins 50 has a front end 52 that extends outward from the front face 44 and a termination or rear end 54 that extends rearward from the rear face 46.

Each module 30 includes a second set of front access pins 56 that are affixed on the printed circuit board 40. The second set of front access pins 56 are arrayed in four columns of four pins each. The second set of front access pins 56 have a prescribed second length of less than the length of the front access pins. Preferably, the pins 56 have a length of approximately 1 inch, and less than one-half of the length of the pins 50.

Each pin 56 has a front end 58 that extends outwardly from the front face 44 in the upper test access section 34 to receive an access plug. Each pin 56 has a stud end 60 that extends outward from the printed circuit board, but does not extend outward from the rear face 46. The first set of front access pins 50 and the second set of front access pins 56 serve as pins for providing test and patch access utilizing a female pin plug to the network elements 12, 14.

Each module has a first set of cross-connect pins 62 that are affixed to the printed circuit board 40 and are arrayed in four columns of four pins each having a prescribed third length which is substantially equal to the second length of approximately 1 inch. Each of the pins 62 has a front cross-connect end 64 that projects forward of the front face 44 to facilitate manual wire-wrap cross-connect. Each pin 62 has an opposite or stud end 66 that terminates short of the rear face 46.

Each module 30 further includes a second set of cross-connect pins 68 that are arranged in four columns of four pins each that are mounted to the printed circuit board 40. Each pin 68 extends forward to a front cross-connect end 70 that projects forward of the front face 44 and a terminal end 72 that extends outward from the rear face 46. The length of the pins 68 are a prescribed distance. In a preferred embodiment, the length of the pins 68 are substantially equal to the length of the pins 50. The terminal ends 72 extend outward for connecting to selected network elements 14. The forward ends 64 and 70 provide the cross-connect field for enabling manual wire-wrap cross-connections between selected pins 62, 68 to provide manual front cross-connect capability in addition to the front patch access capability provided by the upper section 34. Pins 62 and 68 are located in the lower cross-connect field section 36 of the panel. The front cross-connect field cover 28 is designed to cover the front pin ends 64 and 70 when the cross-connect field 36 is not in use.

The front module member 38 (FIGS. 6, 8–9) includes a plurality of pin apertures 74 for accommodating the front ends 52, 58, 64 and 70. The rear module member 42 has pin apertures 75 for accommodating the terminal pin ends 54 and 72. It should be noted that the stub ends 60 and 66 do not project from the rear face 46. It should be noted that the front ends 52 and 58 extend outward from the front face a common desired distance. The front ends 64 and 70 extend outward from the front face a distance greater than the front ends 52 and 58 to facilitate wire-wrap cross-connection.

The upper section 34 (FIG. 8–9) of the front module member 38 includes upper plug actuation apertures 76 and lower plug actuation apertures 78 aligned with respective columns.

Each module 30 includes an upper plug support projection 80, a center plug support projection 82 and a lower plug support projection 84 for supporting the plug on the front end 52, 58 of the pins 50 or 56.

Each of the projections 80, 82 and 84 have guide grooves 86 for receiving and guiding complementary surfaces of a test access plug.

The upper plug support projection 80 includes a set of monitor jack apertures 88. The lower plug support projection 84 has four monitor jack apertures 90.

The rear module member 42, in addition to having pin apertures 75, has upper and lower mounting projections 96 for fastening the modules to the top and bottom flanges 19, 21 utilizing appropriate fasteners.

Figure 10:
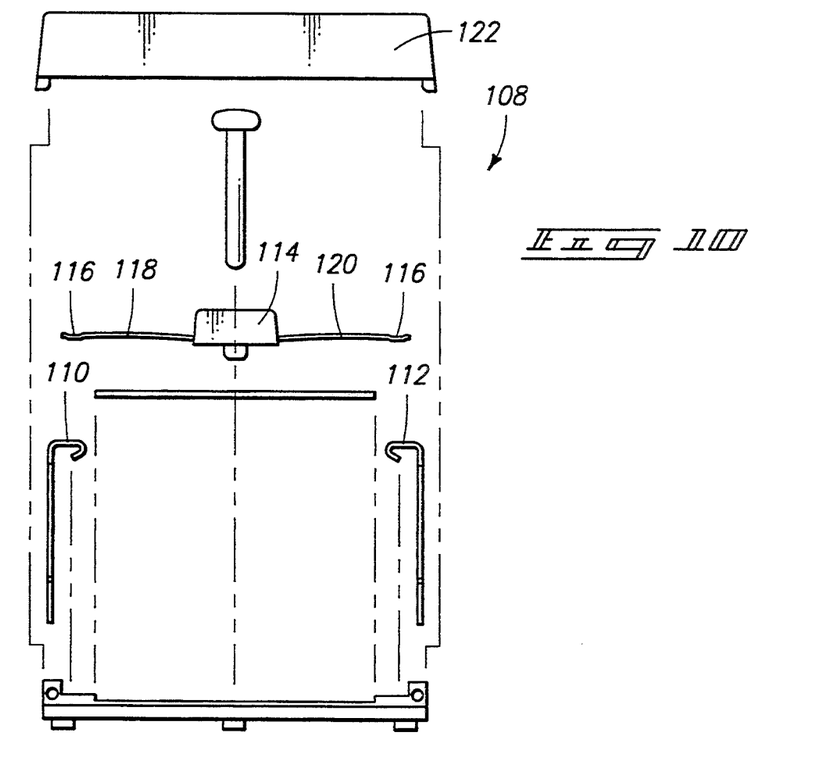
FIG. 10 is an exploded side view of a panel printed circuit board switch assembly.
Figure 11:
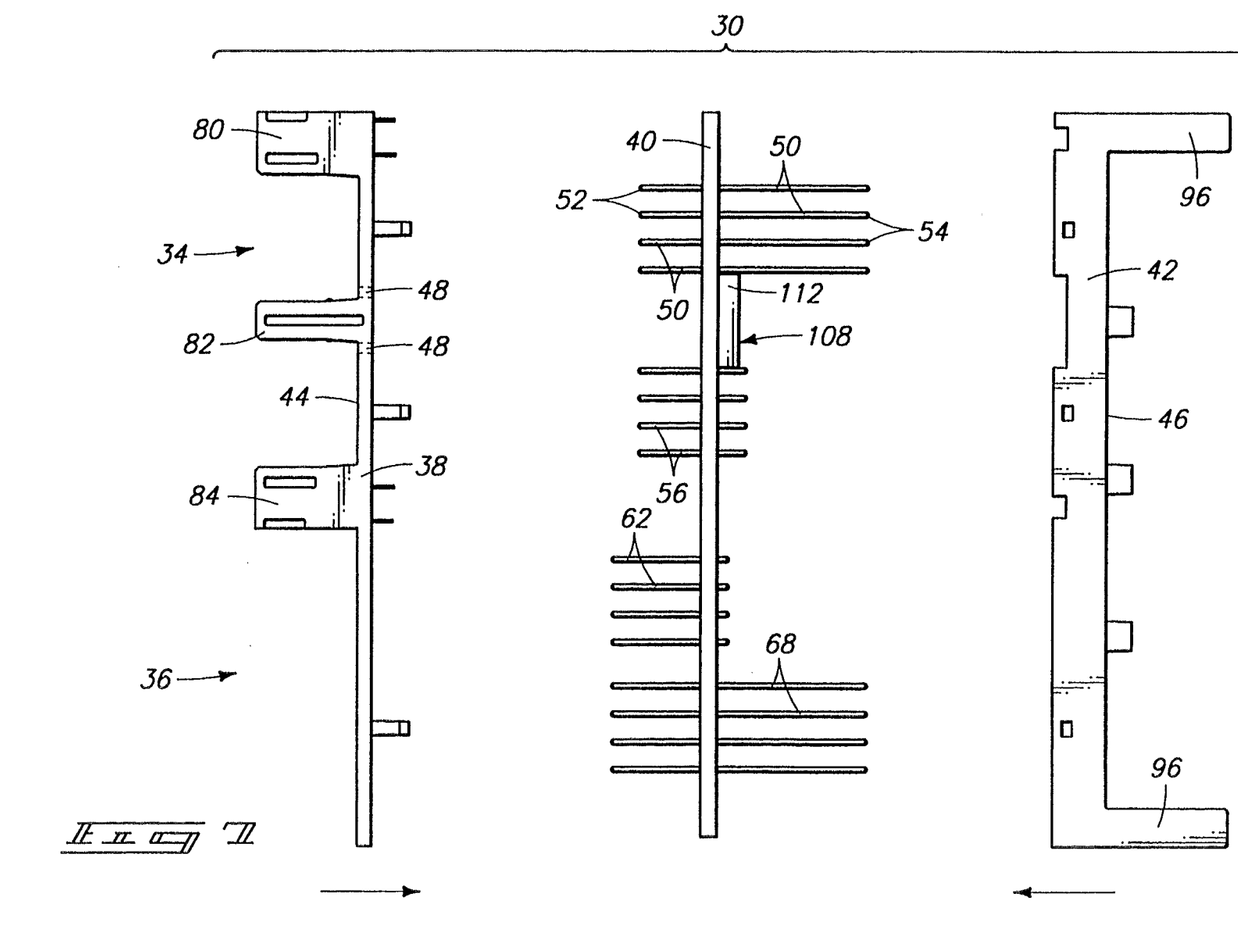
FIG. 11 is an isolated plan view of the switch assembly illustrated in FIG. 10 except showing the switch assembly in an assembled condition.
Figure 12:
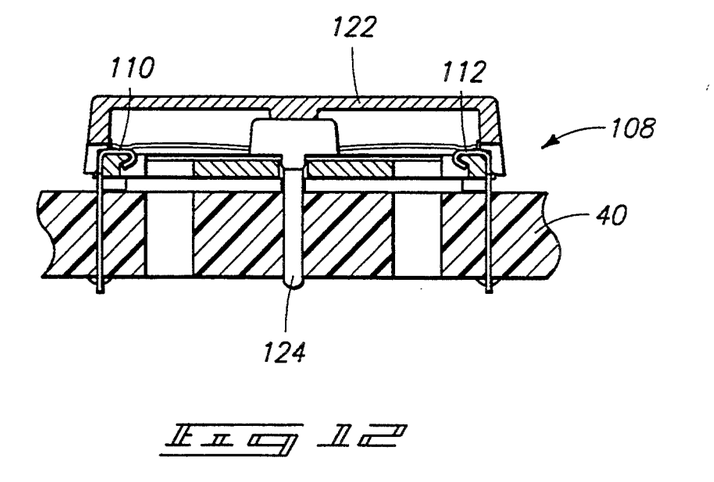
FIG. 12 is cross-sectional view taken along line 12—12 in FIG. 11.
Figure 13:
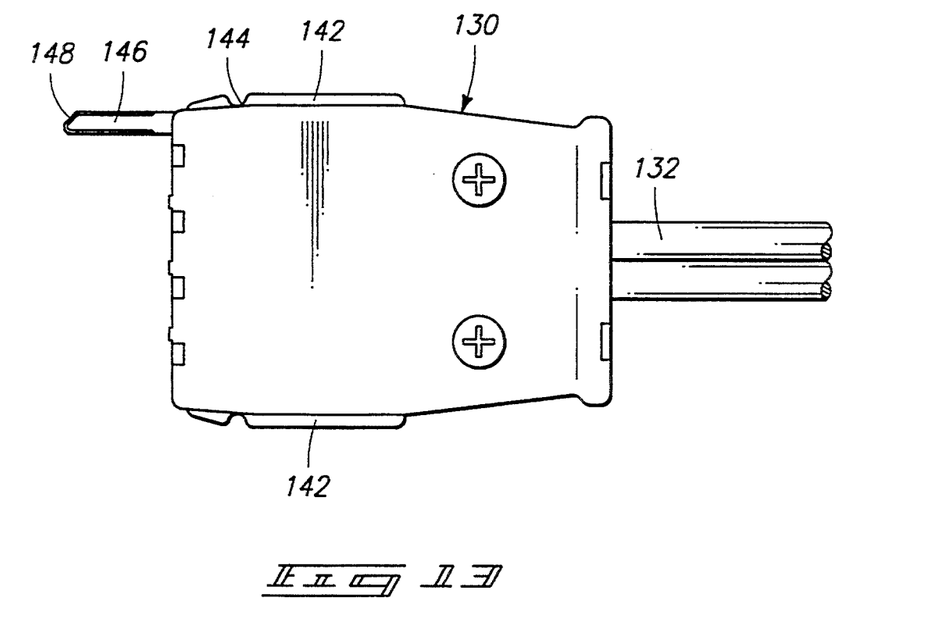
FIG. 13 is an isolated side view of the patch cord plug illustrated in FIG. 8.
Figure 14:
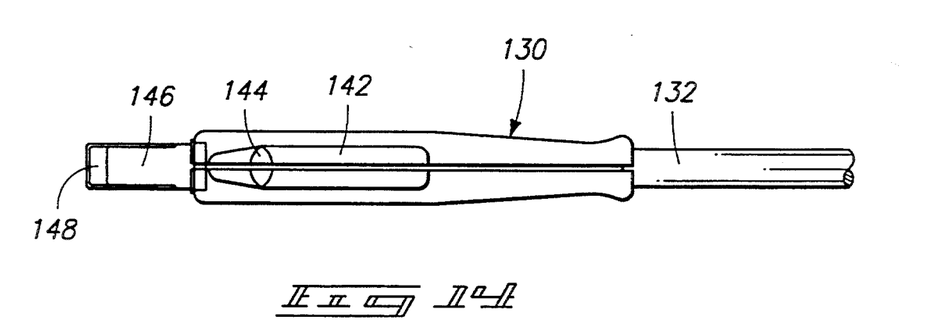
FIG. 14 is an isolated plan view of the patch cord plug illustrated in FIG. 13.

Each of the modules 30 (FIG. 5) includes four electrical circuits 100, 102, 104, 106 that extend between complementary pins 50, 56 and 62, but not pins 68. The electrical circuits 100, 102, 104, 106 are principally formed (printed) on the printed circuit board 40. Each module 30 includes a switch means 108 that operates in conjunction with electrical circuits 100, 102, 104, 106 to provide a make-before-break mechanical switching means to selectively discontinue electrical communication between the respective networks 12, 14. The switch means 108 (FIGS. 10–12) includes stationary contacts 110 that are associated with the pins 50 and stationary contacts 112 which are associated with pins 56 and 62. The stationary contacts 110 and 112 are located on the printed circuit board between the pins 50 and 56.

Switch means 108 includes a central support 114 with bridging spring contacts 116, each having a spring arm 118 that extends outward to normally contact stationary contacts 110 and spring arms 120, normally extending outward to contact stationary contacts 112 to provide continuity in circuits 100, 102, 104 and 106 between the pins 50 and the pins 56 and 62 as illustrated in the schematic of FIG. 5.

The switch means 108 further includes a switch cover 122 (FIGS. 10, 12) with a mounting pin 124 for mounting the switch means securely to the printed circuit board.

Figure 9:
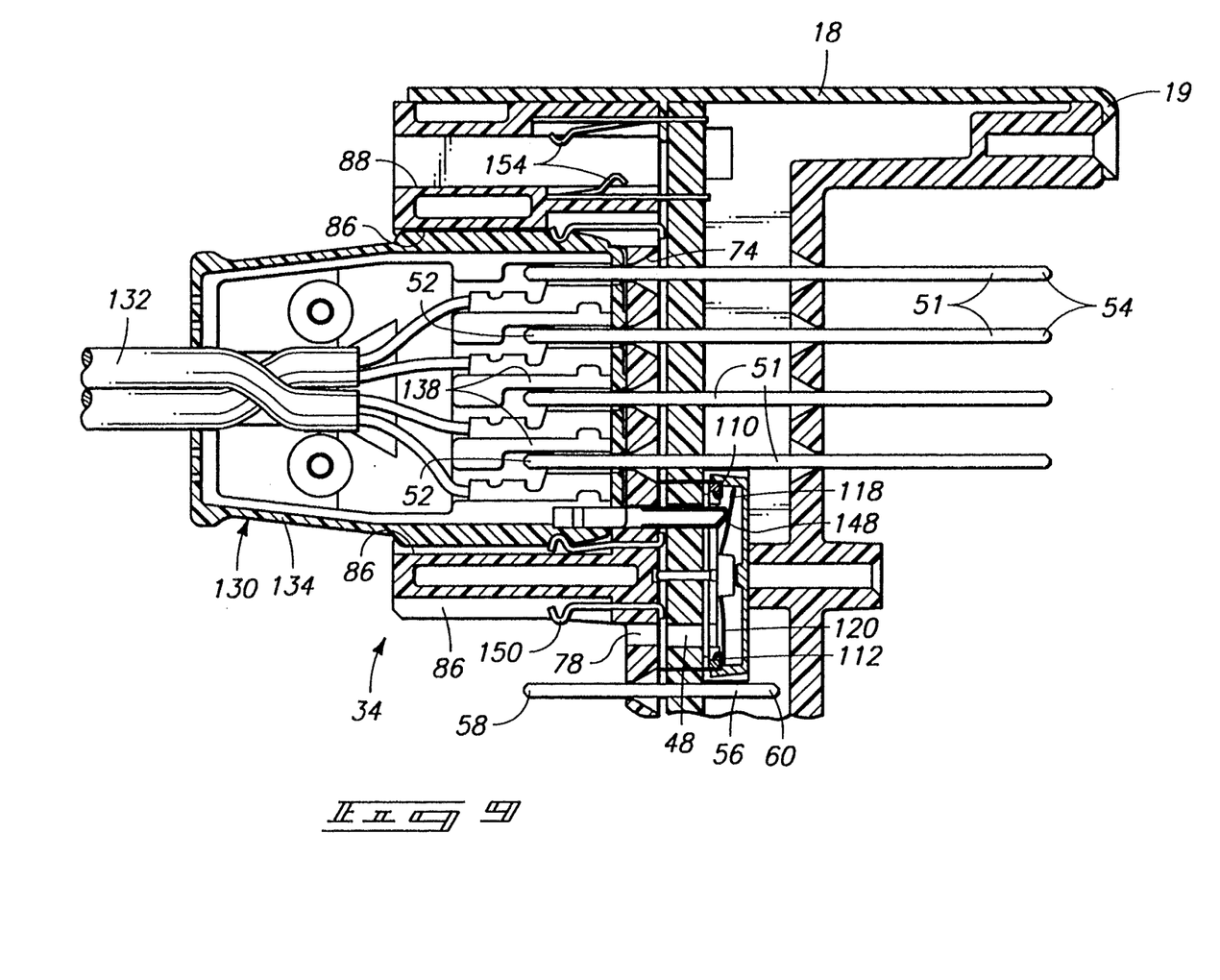
FIG. 9 is an enlarged fragmentary vertical cross-section view similar to FIG. 8 except illustrating the full insertion of the patch cord plug into the front of the panel to gain electrical access to telecommunication network circuits.

A panel assembly including the panel 10 and a patch access plug 130 is described for providing front patch access to the network elements 12 and 14. The patch access plug 130 is connected to the end of a four-wire cable 132 (FIGS. 8, 9). The plug 130 includes a housing 134 with four pin cavities 136 formed therein for receiving a complementary column of four pins 50 or 56. Pin connectors 138 are mounted in the pin cavities 136 for providing electrical contact with the pins 50, 52 when the plug 130 is inserted over the front ends 52 or 58.

The plug 130 includes edges having edge ribs 142 that are complementary to the guide grooves 86 of the projections 80, 82 and 84. As part of a latching means, each of the edge ribs 142 includes an indentation 144.

The plug 130 additionally includes a switch actuation member 146 having a nose end 148 that projects from the front of the plug 130 forward of the pin cavities 136 (FIGS. 8, 9, 13, 14). The nose end 148 is intended to project through the plug actuation apertures 76 or 78 of the front module member 38 and through complementary printed circuit board apertures 48. The patch access plug 130 in conjunction with the switching means 108 provides a make-before-break switching arrangement in which initial contact is made between front ends 52 or 58 of pins 50 or 56 with the pin connectors 138 before the switch means 108 is moved from a normally closed condition to an open condition.

Specifically, the nose end 148 of the switch actuation member 146 is projected through the plug actuation apertures 76 or 78 of front module member and through the printed circuit board apertures 48, the nose end 148 contacts or engages a set of four of the spring arms 118 or 120 to open the normally closed circuit 100, 102, 104 and 106 to disconnect communication between the network element #1 and the network element #2 to enable a patch circuit to focus in isolation on network #1 or network #2.

The module 30 further includes a latching means that comprises a detent spring 150 mounted in the guide grooves 86 that operate in conjunction with the indentation 144 to releasably secure the patch access plug 130 to the front of the panel. The grooves 86 minimize the potential for accidental bending of the front ends 52 and 58 of the wire-wrap pins.

Each module 30 also includes jack spring contacts 154 (FIGS. 8, 9) that are mounted in the monitor jack apertures 88 and 90 for providing electrical contact with jack plugs that are inserted within the apertures 88 and 90. The spring contacts 154 operate in conjunction with monitor electrical circuits 156 and 158 (FIG. 5) to provide isolated monitoring of the signals from the network element 12 or 14.

It is anticipated that the network elements 12 will be principally fiber multiplex circuit network elements and that the network elements 14 will be principally digital loop carrier circuits.

It should be noted that the upper front section 34 of the panel 10 consists of one-hundred-sixty-eight columns and one-hundred-sixty-eight single bantam monitor jacks. The patch access utilizing the female patch access plug 130 provides a make-before-break switching arrangement that is incorporated into the printed circuit board 40. When a plug 130 is initially inserted, contact is first made with the exposed pins. Full insertion then activates the printed circuit board switch means 108 to deactivate communication between network elements 12 and network elements 14.

Consequently, the upper access section 34 of the panel 10 provides for internal connection between corresponding fiber multiplex equipment wire-wrap pins on the upper rear of the panel 10. Specifically, the first set of front access pins 50 provide for internal connection to the corresponding fiber multiplex equipment of four wire-wrap pins on the upper rear of the panel 10. The second set of front access pins 56 provide for internal connection of the corresponding cross-connect pins 62 on the lower front cross-connect section 36. The first set of front access pins 50 and the second set of front access pins 56 additionally provide internal cross-connection to each other to provide simple circuit access for monitoring and patching.

The lower cross-connect field section 36 comprises the first set of cross-connect pins 62 and the second set of cross-connect pins 68 to provide eighty-four columns of eight pins each. The upper four cross-connect pins 62 are cross-connect points for the 84 fiber multiplex circuits and are internally wired to the second set of front access pins 56 to provide make-before-break connectors. The lower four rows of pins of cross-connect pins 68 are the cross-connect points for the eighty-four digital loop carrier circuits. The latter pins 68 extend through the panel to the digital loop carrier equipment termination points on the rear of the panel but are not internally electrically connected to pins 62.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A high density, low frequency telecommunication digital network cross-connect panel for terminating a plurality of four-wire low frequency telecommunication network elements and for enabling direct front cross-connect of such network elements, comprising:
   a panel housing for normally mounting horizontally between uprights of a panel support;
   one or more cross-connect modules mounted in the panel housing, each module having a module body with a front access face and a rear termination face;
   said module having a plurality of elongated wire wrap pins arranged in a matrix of one or more columns and four vertically spaced sets of four rows;
   said module having an upper front patch access section and a lower front cross-connect field section;
   said upper front patch access section having a first set of four rows of elongated wire wrap pins defining four rows of elongated wire-wrap front access pins of a prescribed first length extending through the module body with front ends of the wire-wrap pins of the first set of four rows extending outward from the front access face to receive a front access patch plug and opposite ends extending outward from the rear termination face for connecting each column of the first set of four rows of wire-wrap front access pins with a first selected four-wire network element;
   said upper front patch access section having a second set of four rows of elongated wire-wrap wires defining four rows of elongated wire-wrap front access pins of a prescribed second length mounted to the module with front ends extending outward from the front access face to receive a front access patch plug;
   wherein each column of the second set of four rows of wire-wrap pins is associated with a corresponding column of the first set of four rows of wire-wrap pins;
   said lower front cross-connect field section having a third set of four rows of elongated wire-wrap pins defining four rows of elongated wire-wrap cross-connect pins of a prescribed third length mounted to the module with front ends extending outward from the front access face to provide a first portion of a front cross-connect field;
   wherein each column of the third set of four rows of wire-wrap pins is associated with a corresponding column of the second set of four rows of wire-wrap pins;
   said lower front cross-connect field section having a fourth set of four rows of elongated wire-wrap pins defining four rows of elongated wire-wrap cross-connect pins of a prescribed fourth length extending through the module body with front ends of the second set of wire-wrap cross-connect pins extending outward from the front access face to provide a second portion of a front cross-connect field and opposite ends extending outward from the rear termination face for connecting each column of the fourth set of four rows of the wire-wrap pins with a second selected four-wire network element;
   a first internal electrical circuit electrically interconnecting corresponding pins of each of the first, second and third sets of four rows of wire-wrap pins, without internally electrically interconnecting with a pin of the fourth set of rows of wire-wrap pins;
   a third internal electrical circuit electrically interconnecting corresponding pins of each of the first, second and third sets of four rows of wire-wrap pins, without internally electrically interconnecting with a pin of the fourth set of rows of wire-wrap pins;
   a third internal electrical circuit electrically interconnecting corresponding pins of each of the first, second and third sets of four rows of wire-wrap pins, without internally electrically interconnecting with a pin of the fourth set of rows of wire-wrap pins;
   a fourth internal electrical circuit electrically interconnecting corrsponding pins of each of the first, second and third sets of four rows of wire-wrap pins, without internally electrically interconnecting with a pin of the fourth set of rows of wire-wrap pins;
   said electrical circuits having electrical switch means responsive to insertion of a female access plug onto the front ends of a column of selected first or second set of four rows of wire-wrap pins for interrupting the electrical circuits when the access patch plug is inserted (1) to discontinue electrical communication between the first and second network elements, and (2) to provide direct front signal access to one of the network elements.

2. The high density, low frequency telecommunication digital network cross-connect panel as defined in claim 1 wherein the module includes a printed circuit board member having a front side and a rear side and wherein the wire-wrap pins are affixed thereto with the front ends extending outward from the front side of the printed circuit board and wherein the electrical circuits are mounted on the printed circuit board.

3. The high density, low frequency telecommunication digital network cross-connect panel as defined in claim 2 wherein the electrical circuits have a first set of stationary switch contacts spaced from the first set of four rows of wire wrap pins.

4. The high density, low frequency telecommunication digital network cross-connect panel as defined in claim 3 wherein the electrical circuits have a second set of stationary switch contacts spaced from the second set of four rows of wire wrap pins.

5. The high density, low frequency telecommunication digital network cross-connect panel as defined in claim 4 wherein the switch means includes movable spring contact elements extending between corresponding first and second sets of stationary switch contacts to electrically interconnect the corresponding pins of the first, second and third sets of four rows of wire-wrap pins.

6. The high density, low frequency telecommunication digital network cross-connect panel as defined in claim 5 wherein the movable spring contact elements are supported on the printed circuit board by a central support and wherein each movable spring contact element includes a first switch spring contact arm that extends from the central support to normally contact a respective first set stationary switch contact and a second switch spring contact arm that extends from the central support to normally contact a respective second set stationary switch contact.

7. The high density, low frequency telecommunication digital network cross-connect panel as defined in claim 6 wherein the printed circuit board member has a first access aperture formed therein associated with the first switch spring contact arm for providing switch actuation access to a first switch spring contact and a second access aperture formed therein associated with a second switch contact arm for providing switch actuation access to the second switch spring contact arm.

8. The high density, low frequency telecommunication digital network cross-connect panel as defined in claim 2 wherein the module includes a front face member and a rear face member with the printed circuit board therebetween and wherein each of the face members have apertures formed therethrough for receiving ends of the pins extending outward from the printed circuit board.

9. The high density, low frequency telecommunication digital network cross-connect panel as defined in claim 8 wherein the front face member of the module body has access plug guide projections extending outward from the front face along side the front ends of the first and second sets of four rows of wire-wrap front access pins for receiving and facilitating the insertion of the female access plug onto the front ends of a column of first or second sets of four rows of wire-wrap front access pins.

10. The high density, low frequency telecommunication digital network cross-connect panel as defined in claim 9 wherein the female access plug has edge guides and wherein the guide projections have grooves formed therein aligned with the columns of wire-wrap front access pins for receiving the edge guides of the female access plug to align the plug with a selected column of pins and to facilitate the insertion of the plug onto the selected column of front access pins and to minimize accidental bending of the front ends of the front access pins.

11. The high density, low frequency telecommunication digital network cross-connect panel as defined in claim 9 wherein the guide projections have releasable latching means associated with the female access plug to latch the plug to the panel when the plug is fully inserted over the front ends of the front access pins.

12. The high density, low frequency telecommunication digital network cross-connect panel as defined in claim 11 wherein the releasable latching means includes in indentation formed in the edge guide of the access plug and a spring detent mounted in the projection grooves for releasably mating to secure the access plug on the selected column of wire-wrap pins.

13. The high density, low frequency telecommunication digital network cross-connect panel as defined in claim 1 wherein each column of pins are spaced approximately one-quarter inch from adjacent column of pins.

14. The high density, low frequency telecommunication digital network cross-connect panel as defined in claim 1 wherein the panel has a matrix of eighty-four columns of wire-wrap pins to service one-hundred sixty-eight network elements.

15. The high density, low frequency telecommunication digital network cross-connect panel as defined in claim 1 wherein the prescribed lengths of the first and fourth sets of four rows of wire-wrap pins are greater than the prescribed lengths of the second and third sets of four rows of wire-wrap pins.

16. The high density, low frequency telecommunication digital network cross-connect panel as defined in claim 1 wherein the female access plug has four female cavities for receiving the front ends of the first and second sets of four rows of wire-wrap pins of selected columns as the access plug is inserted over the selected set of pins to initially make electrical contact with the selected set of pins and wherein the female access plug has a switch actuating means and wherein the switching means has movable switch contacts associated with the electrical circuits that are movable from a normally circuit closed condition to a circuit open condition and wherein the movable switch contacts are responsive to the switch actuating means of the female access plug to discontinue electrical communication between the first and second network element when the access plug is inserted onto the selected set of pins.

17. The high density, low frequency telecommunication digital network cross-connect panel as defined in claim 16 wherein the module has plug latching means for releasably securing the female patch plug on the front end of a selected set of pins when the female patch plug is fully inserted onto the front ends.

18. A high density, low frequency telecommunication digital network cross-connect panel assembly for terminating a plurality of four-wire low frequency telecommunication network elements and for enabling direct front electrical test access to signals from such network elements, and front cross-connect capability, comprising:

a panel housing for normally mounting horizontally between uprights of a panel support;

one or more pin modules mounted in the panel housing, each module having a module body with a front access face and a rear termination face;

said module having a plurality of elongated wire wrap pins arranged in a matrix of one or more columns and four vertically spaced sets of four rows;

said module having an upper front test access section and a lower front cross-connect field section;

said upper front patch access section having a first set of four rows of elongated wire wrap pins defining four rows of elongated wire-wrap front access pins of a prescribed first length extending through the module body with front ends of the wire-wrap pins of the first set of four rows extending outward from the front access face to receive a front access patch plug and opposite ends extending outward from the rear termination face for connecting each column of the first set of four rows of wire-wrap front access pins with a first selected four-wire network element;

said upper front patch access section having a second set of four rows of elongated wire-wrap wires defining four rows of elongated wire-wrap front access pins of a prescribed second length mounted to the module with front ends extending outward from the front access face to receive a front access patch plug;

wherein each column of the second set of four rows of wire-wrap pins is associated with a corresponding column of the first set of four rows of wire-wrap pins;

a female patch access plug having four female pin cavities for inserting over the front ends of a selected first or second set of four wire-wrap pins at the front face to provide front patch access to a corresponding network element;

said lower front cross-connect field section having a third set of four rows of elongated wire-wrap pins defining four rows of elongated wire-wrap cross-connect pins of a prescribed third length mounted to the module with front ends extending outward from the front access face to provide a first portion of a front cross-connect field;

wherein each column of the third set of four rows of wire-wrap pins is associated with a corresponding column of the second set of four rows of wire-wrap pins;

said lower front cross-connect field section having a fourth set of four rows of elongated wire-wrap pins defining four rows of elongated wire-wrap cross-connect pins of a prescribed fourth length extending through the module body with front ends of the second set of wire-wrap cross-connect pins extending outward from the front access face to provide a second portion of a front cross-connect field and an opposite end extending outward from the rear termination face for connecting each column of the fourth set of four rows of the wire-wrap pins with a second selected four-wire network element;

a first internal electrical circuit electrically interconnecting corresponding pins of each of the first, second and third sets of four rows of wire-wrap pins, without internally electrically interconnecting with a pin of the fourth set of rows of wire-wrap pins;

a second internal electrical circuit electrically interconnecting corresponding pins of each of the first, second and third sets of four rows of wire-wrap pins, without internally electrically interconnecting with a pin of the fourth set of rows of wire-wrap pins;

a third internal electrical circuit electrically interconnecting corresponding pins of each of the first, second and third set of four rows of wire-wrap pins, without internally electrically interconnecting with a pin of the fourth set of rows of wire-wrap pins;

a fourth internal electrical circuit electrically interconnecting corresponding pins of each of the first, second and third sets of four rows of wire-wrap pins, without internally electrically interconnecting with a pin of the fourth set of rows of wire-wrap pins;

said electrical circuits having electrical switch means responsive to insertion of the female patch access plug onto the one ends of selected first and second columns of pins for interrupting the electrical circuits when the female access plug is inserted (1) to discontinue electrical communication between network elements, and (2) to provide direct front signal access to one of the network elements.

19. The high density, low frequency telecommunication digital network cross-connect panel assembly as defined in claim 18 wherein the module includes a printed circuit board member having a front side and a rear side and wherein the wire-wrap pins extends from the printed circuit board with the front ends extending outward from the front side of the printed circuit board, and wherein the electrical circuits are mounted on the printed circuit board.

20. The high density, low frequency telecommunication digital network cross-connect panel assembly as defined in claim 19 wherein the electrical circuits have a first set of stationary switch contacts spaced from the first set of four rows of wire-wrap pins.

21. The high density, low frequency telecommunication digital network cross-connect panel assembly as defined in claim 20 wherein the electrical circuits have a second set of stationary switch contacts spaced from the second set of four rows of wire-wrap pins.

22. The high density, low frequency telecommunication digital network cross-connect panel assembly as defined in claim 21 wherein the switch means includes movable spring contact elements extending between corresponding first and second sets of stationary switch contacts to electrically interconnect a selected column of first set of four wire-wrap pins and second set of four wire-wrap pins to electrically interconnect the first and second network elements.

23. The high density, low frequency telecommunication digital network cross-connect panel assembly as defined in claim 22 wherein the movable spring contact elements are supported on the printed circuit board by a central support and wherein each movable spring contact element includes a first switch spring contact arm that extends from the central support to contact the first set of stationary switch contacts and a second switch spring contact arm that extends from the central support to respective second set of stationary switch contacts.

24. The high density, low frequency telecommunication digital network cross-connect panel assembly as defined in claim 23 wherein the printed circuit board has a first access aperture formed therein associated with a first switch spring contact arm for providing switch actuation access to the first switch spring contact arm and a second access aperture formed therein associated with a second switch spring contact arm for providing switch actuation access to the second switch spring contact arm.

25. The high density, low frequency telecommunication digital network cross-connect panel assembly as defined in claim 24 wherein the female patch access plug has a switch actuation member for extending through the printed circuit access apertures to engage four switch contact arms to interrupt the electrical circuits when the access plug is inserted to discontinue electrical communication between the corresponding first and second network element.

26. The high density, low frequency telecommunication digital network cross-connect panel assembly as defined in claim 18 wherein the female patch access plug has a switch actuation member and wherein the switch means is responsive to the switch actuation member when the plug is inserted onto the selected column of pins to interrupt the electrical circuits to discontinue electrical communication between the corresponding first and second network elements.

27. The high density, low frequency telecommunication digital network cross-connect panel assembly as defined in claim 19 wherein the module body includes a front face member and a rear face member sandwiching the printed circuit board therebetween and wherein each of the face members have apertures formed therethrough receiving ends of the pins extending outward from the printed circuit board.

28. The high density, low frequency telecommunication digital network cross-connect panel assembly as defined in claim 20 wherein the front face member of the module body has access plug guide projections extending outward from the test access section along side the one ends of the first and second sets of wire-wrap front access pins for receiving and facilitating the insertion of the female access plug onto the front ends of a column of wire-wrap front access pins.

29. The high density, low frequency telecommunication digital network cross-connect panel assembly as defined in claim 28 wherein the female access plug has edge guides and wherein the guide projections have grooves formed therein aligned with the columns of wire-wrap front access pins for receiving the edge guides of the female access plug to align the plug with a selected column of pins and to facilitate the insertion of the plug onto the selected column of pins and to minimize accidental bending of the front ends of the selected column pins.

30. The high density, low frequency telecommunication digital network cross-connect panel assembly as defined in claim 29 wherein the female patch access plug has switch actuation member for actuating the electrical circuit switch means to interrupt the electrical circuits when the female patch access plug is inserted onto the first ends of the selected column of pins.

31. The high density, low frequency telecommunication digital network cross-connect panel assembly as defined in claim 29 wherein the guide projections have releasable latching means associated with the female access plug to latch the plug to the panel when the plug is fully inserted over the first ends of a column of pins.

32. The high density, low frequency telecommunication digital network cross-connect panel assembly as defined in claim 31 wherein the releasable latching means includes in indentation formed in the edge guide of the access plug and a spring detent mounted in the projection grooves for releasably mating to secure the access plug on the selected column pins.

33. The high density, low frequency telecommunication digital network cross-connect panel assembly as defined in claim 18 wherein each column of pins are spaced approximately one-quarter inch from adjacent column of pins.

34. The high density, low frequency telecommunication digital network cross-connect panel assembly as defined in claim 18 wherein the panel has a matrix of eighty-four columns of wire-wrap pins to service one-hundred sixty-eight network elements.

35. The high density, low frequency telecommunication digital network cross-connect panel assembly as defined in claim 18 wherein each module comprises a matrix of four columns.

36. The high density, low frequency telecommunication digital network cross-connect panel assembly as defined in claim 18 wherein the female access plug has a switch actuating means and wherein the switching means has movable switch contacts associated with corresponding electrical circuits that are movable from a normal circuit closed condition to a circuit open condition and wherein the movable switch contacts are responsive to the switch actuating means of the female access plug to discontinue electrical communication between corresponding first and second network elements when the access plug is inserted onto the selected column pins.

37. The high density, low frequency telecommunication digital network cross-connect panel assembly as defined in claim 18 wherein the female access plug and the switch means are designed so that the plug makes electrical contact with the front ends when the plug is initially inserted onto the one ends to initially provide direct front signal access to one of the network elements and then to interrupt the electrical circuits as the plug is fully inserted onto the front ends to discontinue electrical communication between the corresponding first and second network elements.

* * * * *